(12) United States Patent
Davis et al.

(10) Patent No.: US 7,687,557 B2
(45) Date of Patent: Mar. 30, 2010

(54) POLYCARBONATES WITH FLUOROALKYLENE CARBONATE END GROUPS

(75) Inventors: Gary Charles Davis, Albany, NY (US);
Dibakar Dhara, West Bengal (IN);
Brian D. Mullen, Plymouth, MN (US);
Joshua James Stone, Worcester, NY (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 133 days.

(21) Appl. No.: 12/013,141

(22) Filed: Jan. 11, 2008

(65) Prior Publication Data

US 2008/0108777 A1    May 8, 2008

Related U.S. Application Data

(62) Division of application No. 11/022,535, filed on Dec. 22, 2004, now abandoned.

(51) Int. Cl.
*C08L 69/00*    (2006.01)
*C08K 5/42*    (2006.01)
*C08G 64/14*    (2006.01)

(52) U.S. Cl. .................. 524/165; 524/166; 528/202
(58) Field of Classification Search .................. None
See application file for complete search history.

(56) References Cited

U.S. PATENT DOCUMENTS 3,775,367 A * 11/1973 Nouvertne .................. 524/165

FOREIGN PATENT DOCUMENTS

| AU | 2003227193 | * | 10/2003 |
| EP | 837085 | * | 4/1998 |
| WO | WO 2005/059006 | * | 6/2005 |

* cited by examiner

*Primary Examiner*—David Buttner (57) ABSTRACT

Polycarbonate compositions having an aromatic polycarbonate resin with 90% or greater fluoroalkylene carbonate endgroups are formed from a partially fluorinated alcohol or a partially fluorinated polymeric alcohol, and a bisphenol and a carbonate source using melt or interfacial polymerization methods. Copolymers and blends with a variety of other bisphenols and other thermoplastics are also described. The polycarbonate compositions show high water contact angles, fluorine enrichment on the surface layer of molded articles, and good flame retardant properties and are useful in a variety of applications including medical, automotive, telecommunication and weatherable applications.

13 Claims, 7 Drawing Sheets

Figure 1

| Example | % Transmission | Contact Angle (degrees) | Coefficient of Friction |
|---|---|---|---|
| 5 | 88 | 95 | 0.31 |
| 12 | 87 | 96 | 0.34 |
| 13 | 87 | 96 | 0.32 |
| Comp Ex 1* | 89 | 80 | 0.45 |

Comp Ex 1* is a Polycarbonate Comparative Example without Fluorinated End-Groups

| Example | % Transmission | MVR | % FR Salt | FR @ 2.3 mm | FR @ 1.8 mm |
|---|---|---|---|---|---|
| 23A | 87 | 7.4 | 0 | V2 | V2 |
| 23B | 88 | 5.2 | 0.8 | V1 | V2 |
| 23C | 86 | 4.7 | 0.1 | V0 | V1 |
| 23D | 87 | 4.7 | 0.12 | V0 | V0 |
| Comp Ex 2* | 86 | 3.3 | 0.1 | V2 | V2 |
| 24 | Not Measured | 16.2 | 0.12 | V0 | Not Measured |
| Comp Ex 3* | Not Measured | 16.5 | 0.2 | V1 | Not Measured |
| 25 | Not Measured | 13.8 | 0.12 | V1 | Not Measured |
| Comp Ex 4* | Not Measured | 13.3 | 0.12 | V2 | Not Measured |

Comp Ex 2*, 3* and 4* are Polycarbonate Comparative Examples without Fluorinated End-Groups

| Example | Position (ppm) | |
|---|---|---|
| TFE-OH | -78.3 | Triplet |
| TFE-PC | -74.7 | Triplet |
| HFIP-PC | -77.3 | Doublet |
| HFIP-OH | -74.0 | Doublet |
| C9F17-PC | -83.0 | Triplet |
| C9F17-OH | -81.3 | Triplet |

POLYCARBONATES WITH FLUOROALKYLENE CARBONATE END GROUPS

CROSS REFERENCE TO RELATED APPLICATIONS

This application is a divisional of U.S. application Ser. No. 11/022,535, filed Dec. 22, 2004 now abandoned.

BACKGROUND OF THE INVENTION

This application relates to polycarbonate and co-polycarbonate resins, which have fluoroalkylene carbonate end groups, methods to make these polycarbonates, blends of these polycarbonates with other polycarbonates, co-polycarbonates and other thermoplastics, articles made from polycarbonates having fluoroalkylene carbonate end-groups and their blends, and uses of articles made from polycarbonates having fluoroalkylene carbonate end-groups.

Polycarbonate resins have found wide use in consumer items, the automotive industry, medical industry and the building and construction industry as well as many other markets, because of their high heat and impact resistance, and their ability to form very useful blends with other resins. These properties, along with the design flexibility that polycarbonates provide, allow them to be excellent replacements for less design-flexible and often more expensive metals, wood and other engineering materials. One very highly desirable property of many polycarbonate resins is their transparency, which, in combination with their heat resistance and high impact resistance, allows them to replace glass or other transparent thermoplastics in many consumer markets such as the ophthalmic, the optical media, the medical and the building and construction markets.

One property of polycarbonate resins, which, if it could be improved, would lead to still further expansion of the consumer and industrial uses of polycarbonate resins, is an improvement in surface properties. Molded polycarbonate resins having a high tendency to repel water on their surface would be especially useful. Such resins could find use in the ophthalmic, optical media, automotive, medical and building and construction industries and many other industries that require this property. It would similarly be desirable to improve the flame retardant properties of polycarbonate resin articles, especially those having a very thin wall thicknesses.

Fluorinated compounds are known to change the surface features of polycarbonate resins and articles formed from them. Melt blending a fluorinated compound, such as polytetrafluoroethylene, into a polycarbonate resin composition, often produces improvements in flame retardance, surface friction and water repellence, but it also typically results in an opaque or translucent appearance. Melt blends of polycarbonates and fluorinated compounds can also be different to mold because the fluorinated additive can build on the mold surface, causing degradation of the surface quality of resultant molded articles. A better method for introducing fluorinated compounds into a polycarbonate resin composition would be to chemically bond the fluorinated compound directly to the polycarbonate resin chains as co-monomer or as an end-group (the words "end-group" and end-cap" refer to monofunctional chemicals that bond to the end of polymer chains, typically inhibiting further chain growth). This approach is thought to help avoid the mold surface build-up problems mentioned above. The incorporation of fluorinated end-groups into polycarbonate resins would be a particularly simple and cost effective solution. However, a particular challenge to this approach is the tendency of many fluorinated end-group structures to undergo chemical or thermal reactions during the formation of the polycarbonate resin or in subsequent extrusion or molding operations. Such reactions can result in the detachment of the fluorinated end-cap from the polycarbonate resin chains, and resulting loss of the desirable properties.

The present invention provides for a polycarbonate resin composition having fluorinated end-groups, that are highly stable during polycarbonate resin formation reactions and subsequent extrusion and molding processes. The fluorinated end-groups can be readily incorporated into polycarbonate resins using a variety of polycarbonate resin formation methods. The molded articles from these compositions exhibit unusual and useful surface features, and possess excellent thin wall FR properties.

BRIEF SUMMARY OF DRAWINGS

Referring now to the following Figures in which.

BRIEF DESCRIPTION OF THE INVENTION

The present invention relates to polycarbonate resin compositions having fluoroalkylene carbonate end groups, methods for making said compositions, and articles formed from said compositions and uses of said articles.

In one aspect of the invention, a polycarbonate composition comprises an aromatic polycarbonate resin having fluoroalkylene carbonate end-groups, wherein the fluoroalkylene carbonate end-groups comprise 90% or greater of the total end-groups of the aromatic polycarbonate.

In another aspect of the invention the composition described above also comprises a flame retardant additive.

In another aspect of the invention a method for making a polycarbonate resin with fluoroalkylene end-groups, is described. The method comprises the steps of producing a fluoroalkylene chloroformate and then adding the fluoroalkylene chloroformate to a mixture comprising a dihydroxy aromatic compound, phosgene, an organic solvent, water, an organic base and an inorganic base.

In another aspect of the invention, a method for making a polycarbonate resin is described. The method comprises melt condensing a mixture comprising a fluoroalkylene alcohol, a dihydroxy aromatic compound and a diarylcarbonate in the presence of a transesterification catalyst.

In still another aspect of the invention, a method for determining the authenticity of a polycarbonate article is described. The method comprises the steps of: producing a polycarbonate resin having fluoroalkylene carbonate end-groups, forming an article from the polycarbonate resin, and authenticating the article by identifying the presence of fluoroalkylene carbonate end-groups.

In still other aspects of the invention articles formed from the compositions and by the methods described above are flame retardant articles, medical devices useful in blood contact applications and medical devices useful in the contact with ionizing radiation.

In another aspect, there is provided an aromatic polycarbonate resin having fluoroalkylene carbonate end-groups and aromatic carbonate end-groups that are not fluorinated.

In yet another aspect, there is provided a polycarbonate composition comprising an aromatic polycarbonate resin having fluoroalkyl-carbonate end-groups and a fire retardant additive.

DETAILED DESCRIPTION OF PREFERRED EMBODIMENTS

The present invention may be understood more readily by reference to the following detailed description of preferred embodiments of the invention and the examples included therein, but the claims are intended to define the invention and these embodiments should not be read to limit the breadth of the claims. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, or that the subsequently defined element or ingredient may or may not be present and that the description includes instances where the event occurs and instances where it does not.

The term "carbonate end group" refers to the chemical structure present at the ends of the polycarbonate chains attached to the polycarbonate chains through the final carbonate linkage on the polycarbonate chains. The specific type of "carbonate end-group" refers to the type of hydroxy compound from which the "carbonate end-group" was formed. For example, a phenol "carbonate end-group" would have the chemical structure (C6H5-O—C(O)—O—).

The general term "fluoroalkylene carbonate end group" refers to a fluoroalkylene group attached to the last carbonate group of the polycarbonate chain and formed from its reaction with a fluoroalkylene alcohol having at least one α-substituent that is not a fluorine atom. For example, a "trifluoroethylene carbonate" end group formed from a carbonate group's reaction with $CF_3$—$CH_2$—OH would have the chemical structure ($CF_3CH_2$—O—C(O)—O—).

The term "percent or percentage of end groups" means that percentage of end groups at the end of a polycarbonate resin chain out of a total of 100%, which possess an end group structure of a particular type as determined by an end group characterization technique such as NMR. For example, 90% fluoroalkylene carbonate end groups refers to the fact that for a particular polycarbonate resin composition, 90% of the polycarbonate resin end-groups (two per chain, if linear) are fluoroalkylene carbonate end-groups and the remaining 10% end groups have some other chemical structure.

The term "fluorinated" or "fluoroalkylene" refers to alkylene structures that have one or more fluorines on the alkylene chain.

As used herein the term alkylene refers to a radical having a valence of at least one comprising a linear or branched array of atoms, which is not cyclic. The array may include heteroatoms such as nitrogen, oxygen, sulfur, silicon, and phosphorous or may be composed exclusively of carbon and hydrogen. Examples of aliphatic radicals include methyl, methylene, ethyl, ethylene, hexyl, hexamethylene, trifluoromethyl, trifluoroethyl, methoxy, ethyloxy, oxyethyleneoxy —$(O(CH_2)_2O$—, trimethylsilyl, and the like. Aliphatic radicals may be substituted or unsubstituted and may comprise one or more substituents including amino groups, halogen atoms, cyano groups, nitro groups, hydroxyl groups, mercapto groups, $C_1$-$C_{10}$ alkyl groups, $C_1$-$C_{10}$ alkoxy groups, $C_1$-$C_{10}$ alkoxycarbonyl groups, $C_1$-$C_{10}$ alkylthio groups, $C_1$-$C_{10}$ alkylamino groups, and the like.

As used herein the term "cycloalkylene" refers to a radical having a valance of at least one comprising an array of atoms which is cyclic but which is not aromatic. The array may include heteroatoms such as nitrogen, oxygen, sulfur, silicon, and phosphorous or may be composed exclusively of carbon and hydrogen. Examples of cycloaliphatic radicals include cyclopropyl, cyclopentyl cyclohexyl, tetrahydrofuranyl and the like. Cycloaliphatic radicals may be substituted or unsubstituted and may comprise one or more substituents including amino groups, halogen atoms, cyano groups, nitro groups, hydroxyl groups, mercapto groups, $C_1$-$C_{10}$ alkyl groups, $C_1$-$C_{10}$ alkoxy groups, $C_1$-$C_{10}$ alkoxycarbonyl groups, $C_1$-$C_{10}$ alkylthio groups, $C_1$-$C_{10}$ alkylamino groups, and the like. As used herein the term cycloaliphatic radical includes structures comprising a plurality of non-aromatic cyclic arrays, for example the 2-tetralinyl radical.

As used herein the term "aromatic radical" refers to a radical having a valence of at least one comprising at least one aromatic group. Examples of aromatic radicals include phenyl, pyridyl, furanyl, thienyl, naphthyl, phenylene, biphenyl, and biphenylene. The term includes groups containing both aromatic and aliphatic and or cycloaliphatic components, for example a benzyl group or an indanyl group. Aromatic radicals may be substituted or unsubstituted and may comprise one or more substituents including amino groups, halogen atoms, cyano groups, nitro groups, hydroxyl groups, mercapto groups, $C_1$-$C_{10}$ alkyl groups, $C_1$-$C_{10}$ alkoxy groups, $C_1$-$C_{10}$ alkoxycarbonyl groups, $C_1$-$C_{10}$ alkylthio groups, $C_1$-$C_{10}$ alkylamino groups, and the like.

"BPA" is herein defined as bisphenol A and is also known as 2,2-bis(4-hydroxyphenyl)propane; 4,4'-isopropylidenediphenol, and p,p-BPA.

The terms "end-capping agent" or "chain stoppers" refer to monofunctional chemicals that, when present in the polycarbonate resin formation reaction, stop polycarbonate chain growth. A fluoroalkylene alcohol, as mentioned above, is an example of a type of "end-capping agent" or "chain stopper."

The term "repeating unit" refers to a part of a copolymer structure corresponding to one repeating unit. For example a dimethylsiloxane repeating unit would refer to one repeating segment corresponding to the chemical formula —[OSi(CH$_3$)$_2$]—.

The term "article" designates any and all items that are formed from molding, extrusion, casting, lamination, or otherwise processing items.

The present invention involves polycarbonate resin compositions having fluoroalkylene carbonate end-groups. The fluoroalkylene carbonate end-groups of the present invention are formed during the polycarbonate formation reaction from fluoroalkylene alcohols, which are present as end-capping agents in the polycarbonate formation reaction. The "fluorinated alcohols" described herein have at least one α-substituent that is not a fluorine atom. Preferred fluorinated alcohols have the general structure 1 below:

1 where R$_1$=H, R$_2$=H or alkylene or aromatic or CF$_3$ or other fluoroalkylene and R$_3$=CF$_3$, or other fluoro alkylene, such as, for example of the formula —(CF$_2$)$_x$—CF$_3$ where x is 1-20, or a perfluoroalkyl polyether with the formula —CH$_2$—(CF$_2$—CF$_2$—O—)$_n$—CF$_3$ (M$_w$=100-5000), or a fluorinated surfactant with the structure, R$_f$—(CH$_2$—CH$_2$—O)xH, where R$_f$=F(CF$_2$—CF$_2$)$_{3-8}$ with a Mw=170-5000. Chiral fluorinated alcohols, such as CF$_3$—CFH—CF$_2$—CH$_2$—OH, or CF$_3$—(CF$_2$)$_x$—CFH—CF$_2$—CH$_2$—OH where x is 1-20 can also be used in the present invention.

The polycarbonate resins of this invention are formed from aromatic dihydroxy compounds and a carbonate source. Some illustrative, non-limiting compounds of this invention include aromatic dihydroxy compounds and the dihydroxy-substituted aromatic hydrocarbons such as those disclosed by name or formula (generic or specific) in U.S. Pat. No. 4,217,438. A nonexclusive list of specific examples of the types of bisphenol compounds that may be represented by structure 4 includes the following: 1,1-bis(4-hydroxyphenyl)methane; 1,1-bis(4-hydroxyphenyl)ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl)phenylmethane; 2,2-bis (4-hydroxy-1-methylphenyl) propane; 1,1-bis(4-hydroxy-t-butylphenyl) propane; bis(hydroxyaryl) alkanes such as 2,2-bis(4-hydroxy-3-bromophenyl) propane; 1,1-bis(4-hydroxyphenyl)cyclopentane; 4,4'-biphenol; and bis(hydroxyaryl)cycloalkanes such as 1,1-bis(4-hydroxyphenyl)cyclohexane; and the like as well as combinations comprising at least one of the foregoing aromatic dihydroxy compound.

Some non-limiting carbonate sources of this invention include phosgene, diphosgene and diarylcarbonates.

It is also possible to include aliphatic or aromatic diacids or their diacid chlorides as co-monomers with aromatic dihydroxy compounds in the present invention. Generally, useful aliphatic diacids have about 2 to about 40 carbons. A preferred aliphatic diacid is dodecanedioic acid. Possible aromatic diacids include but are not limited to terephthalic and isophthalic acids. Aliphatic di-alcohols, such as ethylene glycol, can also be employed in this invention.

Hydroxyaryl-terminated polydiorganosiloxanes may be used in combination with fluorinated alcohols and the dihydric phenols, aliphatic or aromatic diacids to form fluoroalkylene end-capped polycarbonate copolymers containing polydiorganosiloxane blocks. Hydroxyaryl-terminated polydiorganosiloxanes can be made in the manner described in U.S. Pat. No. 5,530,083. Some non-limiting examples of the aliphatically unsaturated monohydric phenols which can be used to make the hydroxyaryl-terminated polydiorganosiloxanes are: 2-methoxy-4-alkylphenol (also known as eugenol), 2-allylphenol, 4-allyl-2-methylphenol, 4-allyl-2-phenylphenol, 4-allyl-2-bromophenol, 4-allyl-2-t-butoxyphenol, 2-methyl-4-propargylphenol, 2-allyl-4,6-dimethylphenol, 2-allyl-4-bromo-6-methylphenol, 2-allyl-6-methoxy-4-methylphenol and 2-allyl-4,6-dimethylphenol. Some non-limiting examples of the hydroxyaryl-terminated polydiorganosiloxanes used in this invention are phenol-siloxanes included within the formula of structure 2

Structure 2 where each R may be the same or different and is selected from the group of radicals consisting of hydrogen, halogen, C$_{(1-8)}$ alkoxy, C$_{(1-8)}$ alkyl and C$_{(6-13)}$ aryl, R$^1$ is a C$_{(2-8)}$ divalent aliphatic radical, each R$^2$ is independently a C$_{(1-13)}$ monovalent organic radical, and n is an integer greater than or equal to 1, preferably greater than or equal to 6, more preferably 10, more preferably greater than or equal to 25, and most preferably greater than or equal to 40. It is also preferred to have n be an integer less than or equal to 1000, preferably less than or equal to 100, more preferably less than or equal to 75, and most preferably less than or equal to 60. In one embodiment n is less than or equal to 50. In another embodiment, n is an integer from 30 to 60. As used hereinafter, diorganosiloxy units are defined as the portion —[R$^2$—SiO—R$^2$]— of the formula shown above. Preferred hydroxyaryl-terminated polydiorganosiloxanes are those where R$^2$ is methyl and R is hydrogen or methoxy and is located in the ortho position to the hydroxy group and R$^1$ is propyl and is located ortho or para to the hydroxyl group.

Other examples of suitable hydroxyaryl-terminated polydiorganosiloxanes include those described in U.S. Pat. No. 4,746,701 to Kress et al., which is incorporated herein by reference. Specifically, the polysiloxane block may be derived from a polydiorganosiloxane having the structure 3.

3 wherein the radicals Ar are identical or different arylene radicals from diphenols with preferably 6 to 30 carbon atoms;

R and R¹ are identical or different and denote linear alkyl, branched alkyl, halogenated linear alkyl, halogenated branched alkyl, aryl or halogenated aryl, but preferably methyl, and the number of the diorganosiloxy units (the sum o+p+q) is about 5 to about 120.

In combination with the fluorinated alcohols, other end-capping agents may be present in the polycarbonate formation reaction to form a mixture of fluorinated and non-fluorinated carbonate end groups. Possible, non-limiting examples of non-fluorinated hydroxy aromatic compounds useful as end-capping agents include p-cumylphenol, phenol, p-tert-butylphenol, cardinol, octylphenol, nonylphenol and other end-capping agents that are well known in the art or any combination of the above. In addition to fluorinated alcohols, perfluorinated or partially fluorinated aromatic dihydroxy compounds such as pentafluorophenol or trifluorophenol can be present as end-capping agents. The partially fluorinated hydroxy aromatic compounds can have additional aliphatic or aromatic substituent groups in place of hydrogen on the partially fluorinated aromatic ring.

The polycarbonate resins having fluoroalkylene carbonate end groups can be formed by a variety of standard methods for forming polycarbonate resins well known in to those skilled in the art, and include the interfacial, melt condensation and polycarbonate solid state reaction processes. Because the fluorinated alcohols, used to form the fluoroalkylene carbonate end groups, are also present in the polycarbonate formation processes as end-capping agents to control the molecular weight of the polycarbonate resin composition, it is desirable that the reaction conditions employed in any of the above three methods are selected to achieve high incorporation of the fluorinated alcohols into the polycarbonate resin compositions. Examples of methods to achieve such conditions are briefly described below.

The types of interfacial processes that can be employed include those well known in the art involving water, an organic solvent, such as methylene chloride, an organic base such as a triakylamine or a phase transfer catalyst, a fluorinated alcohol, an aromatic dihydroxy compound, and phosgene. Alternatively a chloroformate process can be used in which the fluorinated alcohol is converted into a chloroformate by reaction with phosgene and then combined with an aromatic dihydroxy compound, water, an organic solvent, an organic base or phase transfer catalyst, and additional phosgene. The chloroformate formation reaction can be conducted in a standard reactor design (e.g., continuous stirred tank) or in a tubular reactor as described, for example in U.S. Pat. No. 6,780,961.

When an interfacial reaction process is employed, conducting the reaction at a pH of 12 or greater for at least part of the reaction time is often desirable to ensure complete greater than 90% incorporation of the fluorinated alcohol into the polycarbonate resin and achieve the targeted molecular weight of the polycarbonate resin. When a chloroformate process is employed it is often not necessary to conduct the reaction at the higher pH.

Melt condensation processes, well known in the art, can also be employed to form fluoroalkylene carbonate end-capped polycarbonate resins. The compositions could include a combination of a fluorinated alcohol, an aromatic dihydroxy compound, and a diarylcarbonate in combination with a transesterification catalyst. A variety of transesterification catalysts and combination of catalysts well known in the art can be employed to form the fluoroalkylene carbonate end-capped polycarbonate resins. The use of fluorinated alcohols that have boiling points greater than 220° C. are preferred to avoid having loss of the fluorinated alcohol through evaporation during the melt polymerization process resulting in low incorporation of the fluorinated alcohol into the polycarbonate resin composition and difficulty in controlling the molecular weight of the polycarbonate resin composition. Lower boiling fluorinated alcohols can be employed but require special care to avoid loss. Pressurized reactors or pre-reaction processes to form oligomeric polycarbonates with fluoroalkylene carbonate end-groups are alternate or additional means to incorporate lower boiling fluorinated alcohols into a melt condensation process alternate or additional.

Melt polymerization processes can often be accelerated by the use of activated dicarbonates alone or in combination with a non-activated diarylcarbonate. Activated carbonates are defined in the present invention as those diarylcarbonates that are more reactive to dihydroxy aromatic compounds than diphenylcarbonate. In one embodiment of a melt polymerization method for forming polycarbonate resins with alkylene carbonate end-groups, the activated carbonate, bis(methylsalicyl)carbonate, is used in combination with a fluorinated alcohol, an aromatic dihydroxy compound and a transesterification catalyst.

The polycarbonate resin compositions having fluoroalkylene carbonate end-groups of the present invention can also be blended with a variety of other polycarbonate homo and copolymers with or without fluoro alkylene end-groups as well as other thermoplastics. Some non-limiting examples of possible other thermoplastics include: polyamides, polyimides, polyesters; olefin polymers such as ABS or MBS, polystyrene, and polyethylene; polysiloxanes, polysilanes, polysulfones and polytetrafluoroethylene or any combination thereof.

The polymer compositions may contain various additives, which may be used alone or in combination. These additives include such materials as thermal stabilizers, antioxidants, UV stabilizers, plasticizers, visual effect enhancers, extenders, antistatic agents, catalyst quenchers, mold releasing agents, fire retardants, blowing agents, impact modifiers and processing aids. The different additives that can be incorporated in the polymer compositions of the present invention are typically commonly used and known to those skilled in the art.

Visual effect enhancers, sometimes known as visual effects additives or pigments may also be present in the polycarbonate resin compositions of the present invention. They can be incorporated into the composition in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS #522-75-8, from Clariant Corporation) and Macrolex Fluorescent Yellow 10GN (Color Index Solvent Yellow 160:1, from Bayer Corporation). Pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead.

Non-limiting examples of antioxidants that can be used in the polymer compositions of the present invention include tris(2,4-di-tert-butylphenyl)phosphite; 3,9-di(2,4-di-tert-butylphenoxy)-2,4,8,10-tetraoxa-3,9-diphosphaspiro[5.5]undecane; 3,9-di(2,4-dicumylphenoxy)-2,4,8,10-tetraoxa-3,9-diphosphaspiro[5.5]undecane; tris(p-nonylphenyl) phosphite; 2,2',2"-nitrilo[triethyl-tris[3,3',5,5'-tetra-tertbutyl-1,1'-biphenyl-2'-diyl]phosphite]; 3,9-distearyloxy-2,4,8,10-tetraoxa-3,9-diphosphaspiro[5.5]undecane; dilauryl phosphite; 3,9-di[2,6-di-tert-butyl-4-methylphenoxy]-2,4,8,10-tetraoxa-3,9-diphosphaspiro[5.5]undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-biphenylene diphosphonite; (2,4,6-tri-tert-butylphenyl)-2-butyl-2-ethyl-1,3-propanediolphosphite; triisodecylphosphite; and mixtures of phosphites containing at least one of the foregoing. Tris(2,4-di-tert-butylphenyl) phosphite; 2,4,6-tri-tert-butylphenyl-2-butyl-2-ethyl-1,3-propanediol phosphite; bis(2,4-di-tert-butylphenyl)pentaerythritol diphosphite are especially preferred, as well as mixtures of phosphites containing at least one of the foregoing phosphites, and the like.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

Non-limiting examples of UV stabilizers that can be used include 2-(2'-Hydroxyphenyl)-benzotriazoles, e.g., the 5'-methyl-; 3',5'-di-tert.-butyl-; 5'-tert.-butyl-; 5'-(1,1,3,3-tetramethylbutyl)-; 5-chloro-3',5'-di-tert.-butyl-; 5-chloro-3'-tert.-butyl-5'-methyl-; 3'-sec.-butyl-5'-tert.-butyl-; 3'-alpha-methylbenzyl-5'-methyl; 3'-alpha-methylbenzyl-5'-methyl-5-chloro-; 4'-hydroxy-; 4'-methoxy-; 4'-octoxy-; 3',5'-di-tert.-amyl-; 3'-methyl-5'-carbomethoxyethyl-; 5-chloro-3',5'-di-tert.-amyl-derivatives; and Tinuvin® 234 (available from Ciba Specialty Chemicals). Also suitable are the 2,4-bis-(2'-hydroxyphenyl)-6-alkyl-s-triazines, e.g., the 6-ethyl-; 6-heptadecyl- or 6-undecyl-derivatives. 2-Hydroxybenzophenones e.g., the 4-hydroxy-; 4-methoxy-; 4-octoxy-; 4-decyloxy-; 4-dodecyloxy-; 4-benzyloxy-; 4,2',4'-trihydroxy-; 2,2',4,4'-tetrahydroxy- or 2'-hydroxy-4,4'-dimethoxy-derivative. 1,3-bis-(2'-Hydroxybenzoyl)-benzenes, e.g., 1,3-bis-(2'-hydroxy-4'-hexyloxy-benzoyl)-benzene; 1,3-bis-(2'-hydroxy-4'-octyloxy-benzoyl)-benzene or 1,3-bis-(2'-hydroxy-4'-dodecyloxybenzoyl)-benzene may also be employed. Esters of optionally substituted benzoic acids, e.g., phenylsalicylate; octylphenylsalicylate; dibenzoylresorcin; bis-(4-tert.-butyl-benzoyl)-resorcin; benzoylresorcin; 3,5-di-tert.-butyl-4-hydroxybenzoic acid-2,4-di-tert.-butylphenyl ester or -octadecyl ester or -2-methyl-4,6-di-tert.-butyl ester may likewise be employed. Acrylates, e.g., alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or -butyl ester or N-(beta-carbomethoxyvinyl)-2-methyl-indoline may likewise be employed. Oxalic acid diamides, e.g., 4,4'-di-octyloxy-oxanilide; 2,2'-di-octyloxy-5,5'-di-tert.-butyl-oxanilide; 2,2'-di-dodecyloxy-5,5-di-tert.-butyl-oxanilide; 2-ethoxy-2'-ethyl-oxanilide; N,N'-bis-(3-dimethyl-aminopropyl)-oxalamide; 2-ethoxy-5-tert.-butyl-2'-ethyloxanilide and the mixture thereof with 2-ethoxy-2'-ethyl-5,4'-di-tert.-butyl-oxanilide; or mixtures of ortho- and para-methoxy- as well as of o- and p-ethoxy-disubstituted oxanilides are also suitable as UV stabilizers. Preferably the ultraviolet light absorber used in the instant compositions is 2-(2-hydroxy-5-methylphenyl)-2H-benzotriazole; 2-(2-hydroxy-3,5-di-tert-amylphenyl)-2H-benzotriazole; 2-[2-hydroxy-3,5-di-(alpha,alpha-dimethylbenzyl)phenyl]-2H-benzotriazole; 2-(2-hydroxy-5-tert-octylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; nickel butylamine complex with 2,2'-thiobis(4-tert-butylphenol); 2-ethoxy-2'-ethyloxanilide; 2-ethoxy-2'-ethyl-5,5'-ditert-butyloxanilide or a mixture thereof.

Non-limiting examples of fire retardants that can be used include potassium nonafluorobutylsulfonate, potassium diphenylsulfone sulfonate, and phosphite esters of polyhydric phenols, such as resorcinol and bisphenol A.

Non-limiting examples of mold release compositions include esters of long-chain aliphatic acids and alcohols such as pentaerythritol, guerbet alcohols, long-chain ketones, siloxanes, alpha-olefin polymers, long-chain alkanes and hydrocarbons having 15 to 600 carbon atoms.

To prepare the resin compositions of the invention, the components may be mixed by any known methods which include dry mixing all or part of the ingredients of the composition in a tumbler mixer or a ribbon blender or a Henschel mixer and then feeding the mixture together with the remaining ingredients into an extruder or feeding ingredients of the composition downstream in the extruder after the polymer melts to form pellets. Suitable extruders types are twin screw or single screw for the various addition methods. Another alternative embodiment is to form a concentrate of pellets comprising some or all of the ingredients dispersed in the matrix wherein some or all the ingredients are at a higher concentration than the finished pellets. The concentrates are then fed into the feed section of a single or twin screw extruder together to form finished pellets. Alternatively the concentrated pellets can be added downstream from the feed section into the molten polymer.

Molded articles can be formed from the compositions of the invention using any forming method known to one skilled in the art which include but are not limited to injection molding, thermoforming, sheet or film extrusion, calendaring, and compression molding.

The polycarbonates of the present invention are generally transparent polycarbonate materials with glass transition temperatures of about 150° C., and are ductile at room temperature. The surfaces of molded plaques of polycarbonate resins with fluoroalkylene carbonate end-groups are thought to show significantly lower surface polarity compared with polycarbonate resins with non-fluorinated carbonate end-groups. For example, the water contact angles from molded plaques of a polycarbonate with end-groups formed from 2,2,2-trifluoroethanol showed an average water contact angle of 95.50, while the polycarbonate with end-groups formed from p-cumylphenol showed a contact angle of only 80° (Table 1). Higher water contact angles are thought to indicate a higher tendency to repel water. Resins having fluoroalkylene carbonate end-groups also showed lower coefficients of friction than polycarbonate resins having non-fluorinated carbonate end groups (Table 1).

It was also found that the type of molding surface used could control the water contact angles of the surfaces of polycarbonate resin having fluoro alkylene carbonate end-groups. For example the water contact angle of compression molded films varied from 81° to 102° depending on whether the molding surface employed was aluminum foil or polished steel.

X-ray photoelectron spectrometry (hereinafter "XPS") measurements confirmed that the fluorinated end-groups are found preferentially at the lowest surface energy interface when attached to the polycarbonate end-groups. XPS measurement at 2 nm showed 2.7 times more fluorine than at 9 nm (Table 2). Diluting the content of fluorine end-groups by 50% through blending with a polycarbonate resin having p-cumylphenol carbonate end-groups surprisingly only decreased the fluorine content by 18% confirming the strong tendency of fluorinated end-groups to preferentially locate at the surface of a molded article or film compared with non-fluorinated end-groups. Highly surface-active polycarbonate resins of the type achieved through fluorinated alkylene end-groups could be very useful in a variety of applications where non-polar surfaces are very important such as in medical, low-friction parts, automotive lenses, and electro-photographic photoreceptions.

The polycarbonate resins with fluoroalkylene carbonate end-groups of the present invention were also found to be useful to achieve improved FR performance at thin walls while retaining high transparency. These results are summarized in FIG. 3 in which the flame retardant used was potassium perfluorobutylsulfonate. The polycarbonate resins having fluoro alkylene carbonate end-groups consistently outperformed the polycarbonate resins having p-cumylphenol carbonate end-groups at plaque thicknesses of 2.3 and 1.8 mm.

Figure 4:
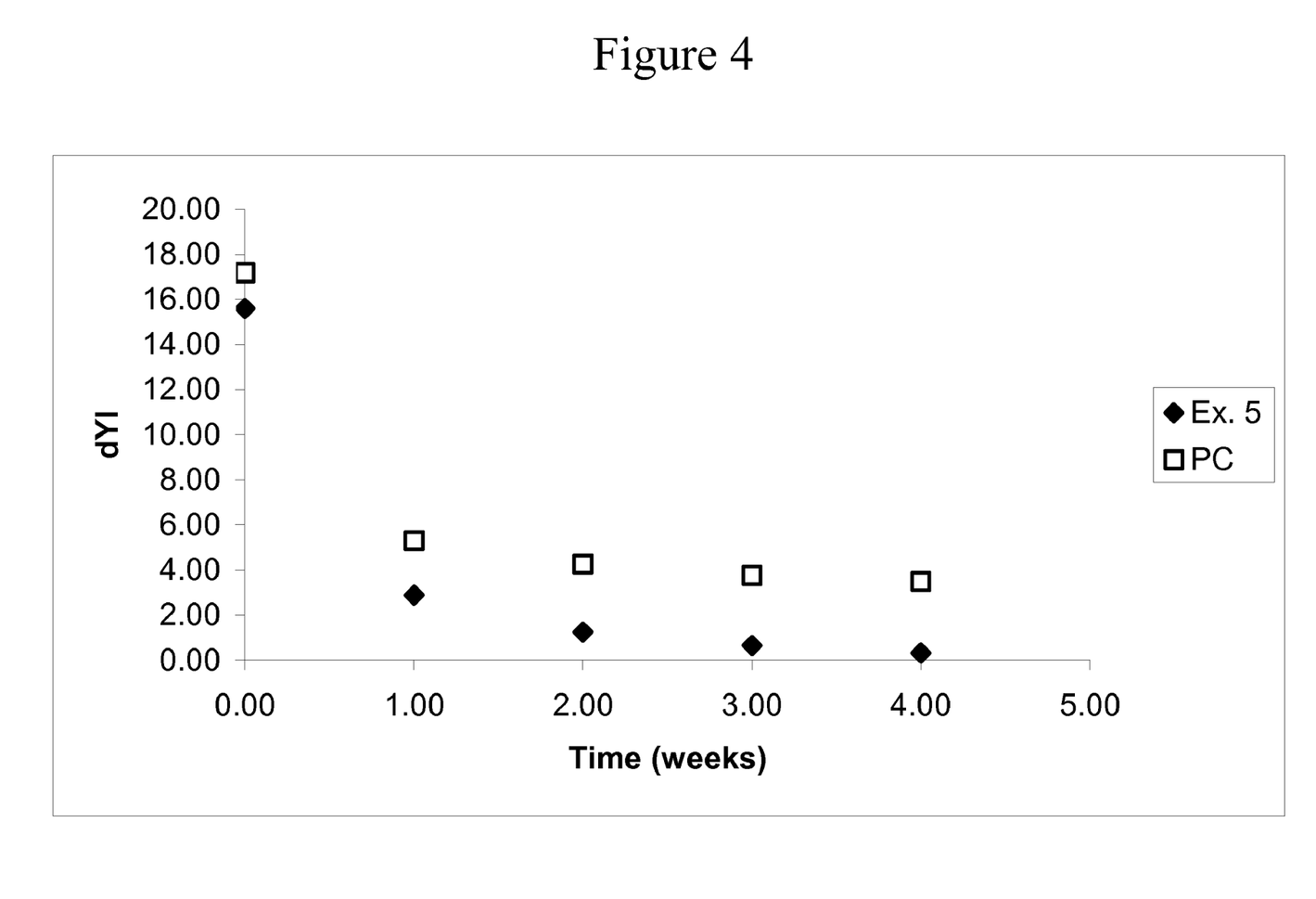
FIG. 4 is a graph comparing the dYI (change in Yellowness Index) over time for molded plaques made from a polycarbonate resin having fluoroalkylene-carbonate end-groups (labeled "Ex. 5") and a polycarbonate resin having p-cumylphenol carbonate end-groups (labeled "PC") after exposure to gamma radiation at 25 kGy.

The polycarbonate resins with fluorinated end-groups of the present invention were also found to be potentially useful in medical articles that are sterilized by exposure to ionizing radiation such as gamma or e-beam irradiation. A comparison of molded plaques formed from a polycarbonate resin having carbonate end-groups made from p-cumylphenol and a polycarbonate resin having end-groups made from trifluoroethanol showed that the trifluoroethanol carbonate end-capped polycarbonate resin plaques consistently performed better in both the initial yellowness increase and the long term change in yellowness after gamma irradiation exposure (FIG. 4).

Many molded polycarbonates, after sterilization, find utility in medical articles that are in contact with blood. Therefore it was important to determine if the fluorinated end-caps affected the blood exposure performance of polycarbonate resins. Circular tubes, with inner diameters of 1.5 mm and outside diameters of 1.75 mm., were extruded from a fluorinated alkylene-end capped polycarbonate of the present invention. The tubes were then filled in platelet-rich plasma to determine whether the fluorinated end groups affected the platelet retention performance of polycarbonate. Results showed that the fluorinated end-cap polycarbonate resins were at least as effective as standard p-cumylphenol end-capped resins in blood compatibility performance.

Figure 5:
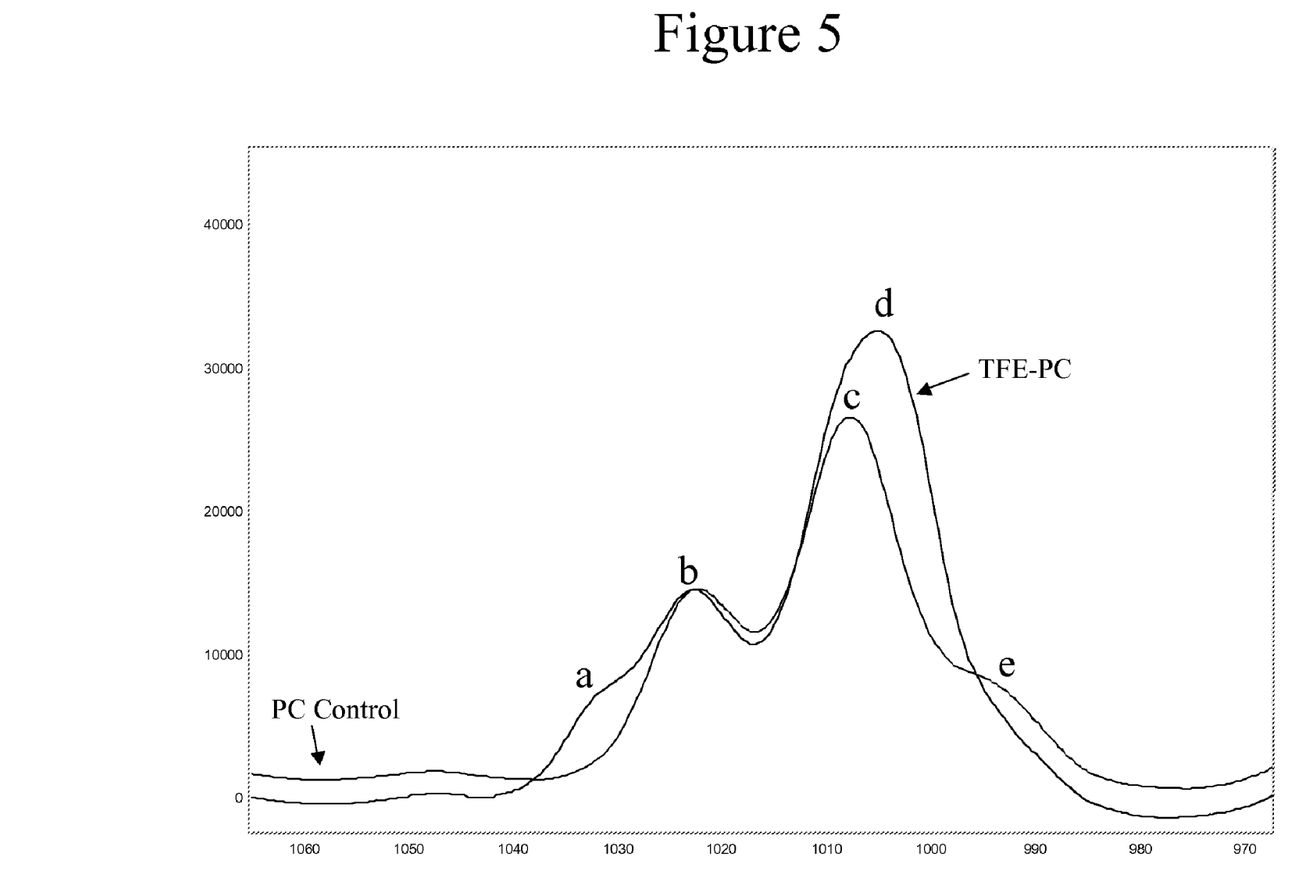
FIG. 5 is a plot of portions of the Raman Spectra obtained from a polycarbonate resin having trifluoroethylene carbonate end-groups (TFE-PC) and a polycarbonate resin having p-cumylphenol end-groups (PC Control).
Figure 6:
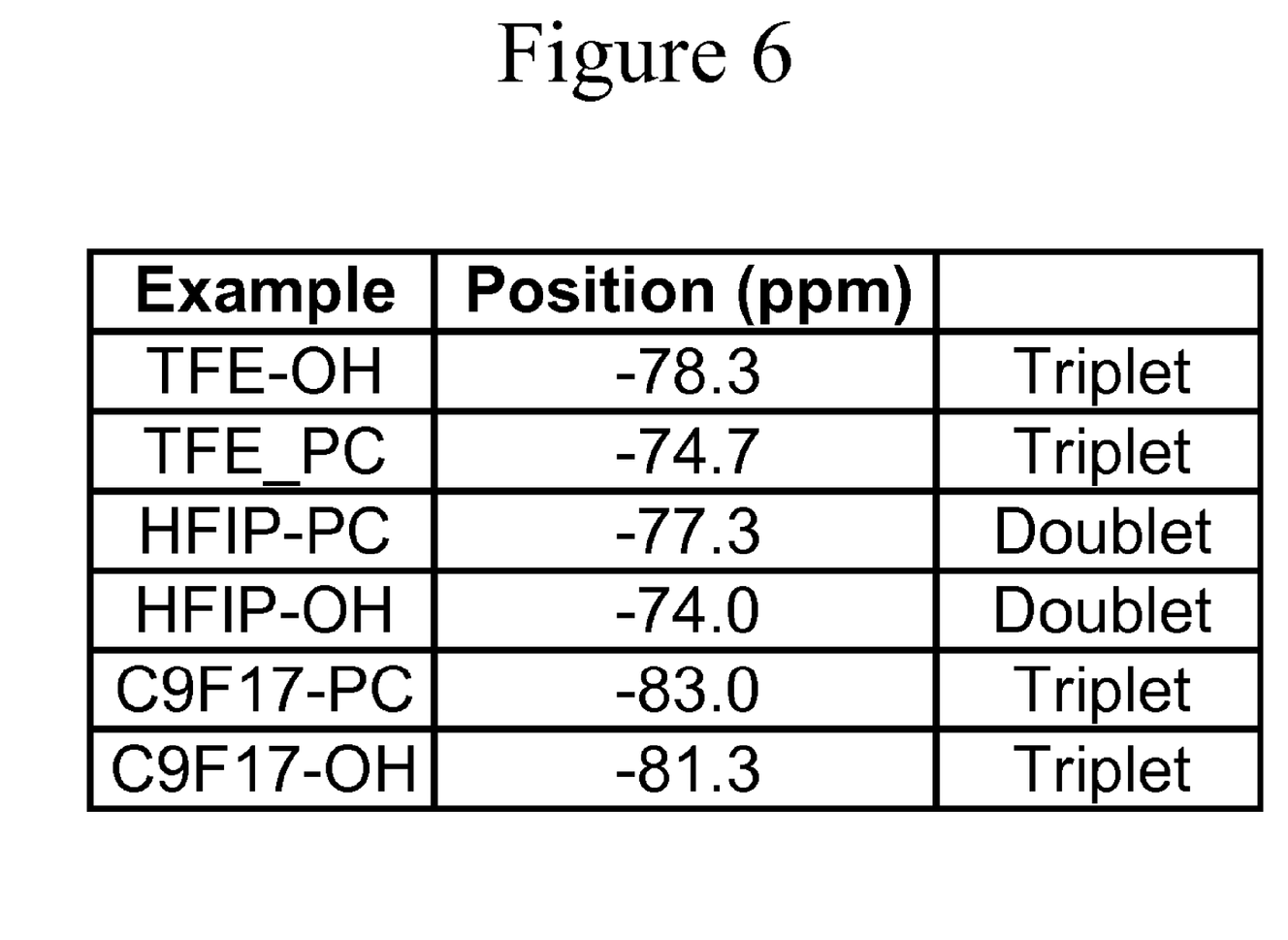
FIG. 6 is a Table comparing the position of the $^{19}$F NMR resonance frequencies (in ppm) for 3 polycarbonate resins having fluorinated end-groups (TFE-PC, HFIP-PC, C9F17-PC) with the small molecule fluorinated alcohol compounds from which they were made (TFE-OH, HFIP-OH, C9F17-OH).

Authenticating that a particular article was made utilizing a certain secure process or molded by certain certified molders or used only by certain certified end-users is a growing priority for a variety of industries where piracy and safety are critical factors. Examples of these industries include audio and video media content providers and pharmaceutical and medical article providers. These providers are seeking means of clearly identifying an authentic and secure product through use of tagged resins, which are provided by a secure and single source. The fluoroalkylene carbonate end-groups of the present invention provide a possible approach to authentication as tagging resins because the fluorine atoms of the fluoro alkylene carbonate end-groups polycarbonates could readily be detected using several simple and readily available detection methods that would not work with polycarbonate resins that did not have any fluorine atoms or different fluorine atoms present. To demonstrate the feasibility of detecting the fluorinated end-groups using simple detection devices, polycarbonate resins having fluoroalkylene carbonate end-groups were compared with polycarbonate resins without fluoroalkylene carbonate end-groups using Raman spectroscopy and $^{19}F$ NMR detection systems (FIGS. 5 and 6). With both detection methods unique features of the fluoroalkylene carbonate-containing polycarbonate resins were observed that could readily distinguish them from polycarbonate resins without fluoroalkylene carbonate end-groups. The fluorine detection systems could also readily distinguish the fluoro alkylene carbonate end groups different polymers from other small molecule that contain fluorine.

The authentication system based on fluorinated end-group containing polycarbonate resins could involve more than one layer of authentication, thus increasing the extent of security of the system. Other layers of security could include using combinations of one or more secure colorants or additives in combination with the fluorinated alkylene end-capped polycarbonate resins. Possible detection systems could include, but not limited to, combinations of visual color changes on exposure to ultraviolet or infra-red or heat or laser light, visual, mechanical or electrical inspection of the part using a variety of detection systems to detect certain secure additives or particle embossments or imbedded data signals in combination with detecting the fluorinated end-caps of the polycarbonate resin system.

EXAMPLES

The following examples are set forth to provide those of ordinary skill in the art with a detailed description of how the compositions, methods, articles and uses claimed herein are evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC) analysis, using polycarbonate molecular weight or polystyrene standards to construct a standard calibration curve against which polymer molecular weights were determined. The temperature of the gel permeation columns was about 25° C. and the mobile phase was chloroform or methylene chloride.

Figure 7:
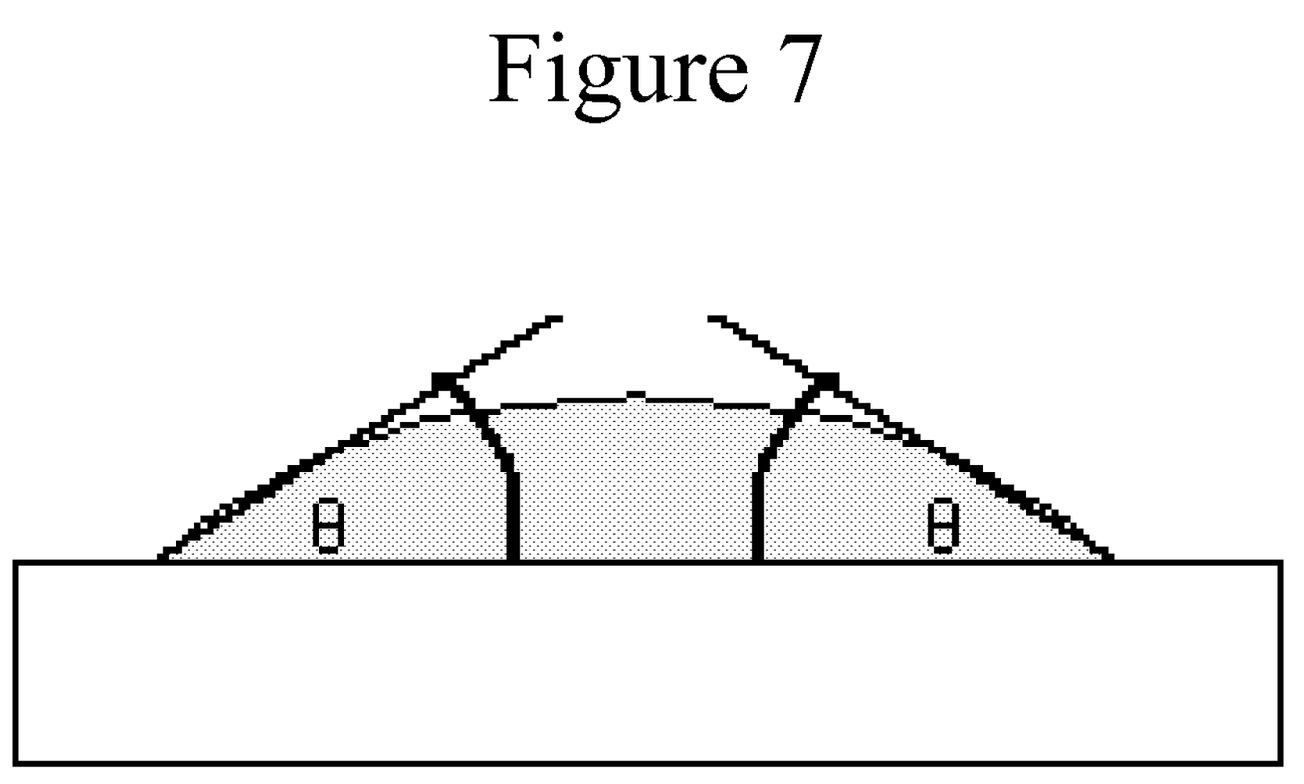
FIG. 7 is a visual representation of a water droplet on a molded plaque formed from a polycarbonate resin illustrating the contact angles, which are measured and reported in Table 1 and in the Examples section of this application.

Contact angle measurements were carried out on a Krüss prop Shape Analysis System type DSA 10 Mk2. A droplet of 1.5 μl deionized water is automatically placed on the sample. The droplet was monitored every 0.2 seconds for a period of 10 seconds by a CCD-camera and analyzed by prop Shape Analysis software (DSA version 1.7, Krüss). The complete profile of the droplet was fitted by the tangent method to a general conic section equation. The angles were determined both at the right and left side (see FIG. 7). An average value is calculated for each drop and a total of five drops per sample are measured. The average of the five drops is taken the contact angle.

Raman spectra were obtained on molded sample plaques using a Kaiser Holoprobe Spectrometer equipped with a near infrared laser diode (785 nm.).

XPS measurements were carried out on molded sample plaques using a Quantum 2000 Scanning XPS Microprobe. Typical analysis area was 1200 micron by 1200 micron to 30 micron by 30 micron. Angular resolved XPS was performed for depth profiling at depths between 2 micron and 10 micron.

Haze measurements were obtained on molded sample plaques with thicknesses of 3.2 millimeters using a calibrated Gretag MacBeth 7000A instrument according to the ASTM D1003 method.

Coefficient of friction measurements were obtained by measuring the force required to move a molded sample plaque with a surface area of 2990 mm$^2$ carrying a load of 2.26 Newtons across a polished steel surface at a speed of 50 mm/minute. The nominal stress was 755 Pascals.

$^{19}$F NMR measurements were obtained using 30-40 mg. of resin powder, extruded pellets or samples of molded plaques, which were dissolved in 1.5 mL of deuterated chloroform. All samples were run on a 400 MHz Varian Mercury NMR instrument, with a spectral window of 56.5 MHz, an acquisition time of 1 second, and a pulse delay of 10 seconds. The data is apodized using 3.5 Hz Lorentzian line broadening and then phase corrected. A 10$^{th}$ order polynomial baseline correction routine was usually used.

Example 1

The following were added into a 500 mL 5-necked glass reactor: (a) BPA (25 g, 0.11 mol); (b) C9F17-OH (4.0 g, 0.0089 mol); (c) triethylamine (0.23 mL, 0.0016 mol); (d) methylene chloride (145 mL); and (e) de-ionized water (144 mL). The mixture was charged with phosgene (13.6 g, 0.75 g/min, 0.14 mol). During the addition of phosgene, base (25 wt % NaOH in deionized water) was simultaneously charged to the reactor to maintain the pH of the reaction between 9-11. After the complete addition of phosgene, the reaction was purged with nitrogen gas, and the organic layer was extracted. The organic extract was washed once with dilute hydrochloric acid (HCl), and subsequently washed with de-ionized water three times. The organic layer was separated and precipitated into vigorously stirred hot water. The polymer was dried in an oven at 110 deg C. before analysis. $^{19}$F and $^1$H NMR confirmed quantitative conversion of C9F17-OH into C9F17-carbonate polymer chain end groups. Surface analysis by XPS confirmed existence of fluorine on the surface, and an enhancement of fluorine at the surface compared to the bulk. The $M_w$ of the polymer was 20,200 g/mol (calculated by polycarbonate universal calibration curve), and the $T_g$=137 deg C.

Example 2

The following were added into a 500 mL 5-necked glass reactor: (a) BPA (25 g, 0.11 mol); (b) TFE-OH (0.9 g, 0.009 mol); (c) triethylamine (0.23 mL, 0.0016 mol); (d) methylene chloride (210 mL); and (e) de-ionized water (140 mL). The mixture was charged with phosgene (13.6 g, 0.75 g/min, 0.14 mol). During the addition of phosgene, base (25 wt % NaOH in deionized water) was simultaneously charged to the reactor to maintain the pH of the reaction between 9-11. After the complete addition of phosgene, the reaction was purged with nitrogen gas, and the organic layer was extracted. The organic extract was washed once with dilute hydrochloric acid (HCl), and subsequently washed with de-ionized water three times. The organic layer was separated and precipitated into vigorously stirred hot water. The polymer was dried in an oven at 110 deg C. before analysis. $^{31}$P NMR proved the existence of a poly(bisphenol A carbonate) with >97% TFE-carbonate polymer chain end groups. Surface analysis by X-ray photoacoustic spectroscopy (XPS) confirmed existence of fluorine on the surface, and an enhancement of fluorine at the surface compared to the bulk. The $M_w$ of the polymer was 30,400 g/mol (calculated by polycarbonate universal calibration curve), and the $T_g$=153 deg C.

Example 3

The following were added into a 500 mL 5-necked glass reactor: (a) 4,4-bis-(hydroxyphenyl)-2,2-propane (BPA) (24.97 g, 0.11 mol); (b) p-cumylphenol (PCP) (0.58 g, 0.0027 mol); (c) 2,2,3,3,4,4,5,5,6,6,7,7,8,8,9,9,9-heptadecafluoro-1-nonanol (C9F17-OH) (0.50 g, 0.0011 mol); (d) triethylamine (0.23 mL, 0.0016 mol); (e) methylene chloride (145 mL); and (f) de-ionized water (140 mL). The mixture was charged with phosgene (13.18 g, 0.75 g/min, 0.133 mol). During the addition of phosgene, base (25 wt % NaOH in deionized water) was simultaneously charged to the reactor to maintain the pH of the reaction between 9-10.5. After the complete addition of phosgene, the reaction was purged with nitrogen gas, and the organic layer was extracted. The organic extract was washed once with dilute hydrochloric acid (HCl), and subsequently washed with de-ionized water three times. The organic layer was separated and precipitated into vigorously stirred hot water. The polymer was dried in an oven at 110 deg C. before analysis. $^{19}$F and $^1$H NMR confirmed quantitative conversion of C9F17-OH into C9F17-carbonate polymer chain end groups, and the existence of PCP-carbonate polymer chain end-groups. Surface analysis by XPS confirmed existence of fluorine on the surface, and an enhancement of fluorine at the surface compared to the bulk. The $M_w$ of the polymer was 20,300 g/mol (calculated by polycarbonate universal calibration curve), and the Tg=144 deg C.

Example 4

The following were added into a 500 mL 5-necked glass reactor: (a) BPA (24.97 g, 0.11 mol); (b) PCP (0.23 g, 0.0011 mol); (c) 2,2,2-trifluoroethanol (TFE-OH) (0.55 g, 0.0055 mol); (d) triethylamine (0.3 mL, 0.0021 mol); (e) methylene chloride (141 mL); and (f) de-ionized water (151 mL). The mixture was charged with phosgene (13.07 g, 0.75 g/min, 0.132 mol). During the addition of phosgene, base (25 wt % NaOH in deionized water) was simultaneously charged to the reactor to maintain the pH of the reaction between 9-10.5. After the complete addition of phosgene, the reaction was purged with nitrogen gas, and the organic layer was extracted. The organic layer was washed once with dilute hydrochloric acid (HCl), and subsequently washed with de-ionized water three times. The organic layer was separated and precipitated into vigorously stirred hot water. The polymer was dried in an oven at 110 deg C. before analysis. $^{19}$F and $^1$H NMR confirmed quantitative conversion of TFE-OH into TFE-carbonate polymer chain end groups, and the existence of PCP-carbonate polymer chain end-groups. Surface analysis by XPS confirmed existence of fluorine on the surface, and an enhancement of fluorine at the surface compared to the bulk. The $M_w$ of the polymer was 28,000 g/mol (calculated by polycarbonate universal calibration curve), and the $T_g$=149 deg C.

Example 5

The following were added into a 30 L 5-necked glass reactor: (a) BPA (2250 g, 9.87 mol); (b) TFE-OH (49.34 g, 0.49 mol); (c) triethylamine (20.63 mL, 0.20 mol); (d) methylene chloride (15 kg); and (e) de-ionized water (7.1 kg). The mixture was charged with phosgene (750 g, 20-30 g/min, 7.58 mol). During the addition of phosgene, base (50 wt % NaOH in deionized water) was simultaneously charged to the reactor to maintain the pH of the reaction between 8-11. After addition of 750 g of phosgene, the pH was raised to 12, and phosgene was charged to the flask again (375 g, 3.79 mol). Then, the pH lowered and maintained at 8-11 for the last charge of phosgene (375 g, 3.79 mol). After the complete addition of phosgene, the reaction was purged with nitrogen gas, and the organic layer was extracted. The organic extract was washed once with dilute hydrochloric acid (HCl), and subsequently washed with de-ionized water three times. The organic layer was separated and precipitated into methanol. The polymer was dried in an oven at 110 deg C. before analysis. $^{31}$P NMR proved the existence of a poly(bisphenol A carbonate) with >97% TFE-carbonate polymer chain end groups. Surface analysis by XPS confirmed existence of fluorine on the surface, and an enhancement of fluorine at the surface compared to the bulk. The $M_w$ of the polymer was 29,900 g/mol (calculated by polycarbonate universal calibration curve). The TFE-PC was extruded on a single screw extruder and injection-molded into ⅛"-thick color plaques. The TFE-PC color plaques were transparent (88% transmission, haze=1.1) and displayed a water contact angle=95 degrees.

Example 6

Into a 1 L Morton flask was charged: (A) BPA (22.8 g, 100 mmol); (B) methylene chloride (100 mL); (C) distilled water (100 mL); (D) HFIP (0.84 g, 5 mol % compared to BPA); and (E) triethylamine (200 μL, 1.43 mmol. The flask was equipped with a calibrated pH probe, mechanical stirrer, condenser, 25% NaOH (by weight) inlet, and tube inlet. With stirring, the pH was initially adjusted to 10.5 and controlled throughout the reaction by pumping in base solution, keeping the pH near 10.5. Phosgene was introduced at 0.75 g/min. for 16 minutes (12 g phosgene total, 122.4 mmol). During this process, 25% NaOH was continuously added to maintain the reaction pH around 10.5. A final pH of 9.7 was established. The polymer solution was separated from the brine, washed with aqueous HCl, washed with water, precipitated into hot water, and dried. $M_w$=35,700 (Polystyrene standards). Proton NMR indicated that complete conversion of the HFIP-OH into 1,1,1,3,3,3-hexafluoro-2-propylcarbonate end group was obtained.

Example 7

Into a 1 L Morton flask was charged (A) BPA (22.8 g, 100 mmol); (B) methylene chloride (100 mL); (C) distilled water (100 mL); and (D) Triethylamine (200 μL, 1.43 mmol). The flask was equipped with a calibrated pH probe, mechanical stirrer, condenser, 25% NaOH (by weight) inlet, and tube inlet. With stirring, the pH was initially adjusted to 10.5 and controlled throughout the reaction by pumping in base solution, keeping the pH near 10.5. Phosgene was introduced at 0.75 g/min for 8 min. (6.0 g, 60 mmol). Separately, a 5% by weight stock solution of 2,2,2-trifluoroethanol (TFE) (7.89 g, 78.9 mmol) in methylene chloride (150 g) was made and, just prior to reacting, triethylamine (11.0 mL, 78.9 mmol) was added to this stock solution. The chloroformate of TFE was then prepared by pumping the stock solution (0.5 g TFE total, 5 mol % based on bisphenol-A) through a tubular reactor at a rate of 20.0 g/min. for 0.5 minutes and adding phosgene at a rate of 2.0 g/min (4/1 mole ratio of phosgene per TFE). Each reagent was added in the first section of tubing and pumped through four additional mixing sections before reaching the batch reactor containing the reactants (A)-(D). After 0.5 minutes of charging chloroformate to the Morton flask, the flow of the TFE stock solution was discontinued and the phosgene flow lowered to 0.75 g/min. for 8 minutes (12 g phosgene total, 122.4 mmol). During this process, 25% NaOH was continuously added to maintain the reaction pH around 10.5. The polymer solution was separated from the brine, washed with aqueous HCl, washed with water, precipitated into vigorously-stirred hot water, and dried. $M_w$=28,800 g/mol (Polystyrene standards). Proton NMR indicated that complete incorporation of the TFE to 2,2,2-trifluoroethylcarbonate end groups. A compression molded film exhibited a contact angle with water of 102.0°.

Example 8

Into a 1 L Morton flask was charged (A) BPA (22.8 g, 100 mmol); (B) methylene chloride (100 mL); and (C) distilled water (100 mL). The flask was equipped with a calibrated pH probe, mechanical stirrer, condenser, 25% NaOH (by weight) inlet, and tube inlet. With stirring, the pH was initially adjusted to 10.5 and controlled throughout the reaction by pumping in base solution, keeping the pH near 10.5. In a separate flask, a 2% by weight stock solution of 1,1,1,3,3,3-hexafluoro-2-propanol (HFIP) (3.1 g, 18.4 mmol) in 150 g of methylene chloride was prepared, and just prior to reacting, triethylamine (2.53 mL, 18.4 mmol) was added to this stock solution. The chloroformate of HFIP (0.84 g HFIP total, 5 mol % based on BPA) was prepared by pumping the stock solution through a tube at a rate of 20.0 g/min for 2.1 minutes and adding phosgene at a rate of 0.93 g/min (4/1 mole ratio of phosgene per HFIP). Each reagent was added in the first section of tubing and pumped through four additional mixing sections before being pumped into the batch reactor containing (A-C). After 2.1 minutes of charging chloroformate to the Morton flask, the flow of the HFIP stock solution was discontinued and the phosgene flow lowered to 0.75 g/min. for 16 minutes (12 g phosgene total, 122.4 mmol). During this process, 25% NaOH was continuously added to maintain the reaction pH around 10.5. A final pH of 9.6 was established, requiring 47.5 g of base solution. The polymer solution was separated from the brine, washed with aqueous HCl, washed with water, precipitated into hot water, and dried. $M_w$=34,700 (Polystyrene standards). Proton NMR indicated complete incorporation of HFIP into the 1,1,1,3,3,3-hexafluoro-2-propylcarbonate polymer chain end group.

Example 9

Into a 1 L Morton flask was charged: (A) BPA (22.8 g, 100 mmol); (B) methylene chloride (100 mL); (C) distilled water (100 mL); (D) PCP (0.21 g, 1 mol % compared to BPA); and (E) triethylamine (100 □L, 0.77 mmol). The flask was equipped with a calibrated pH probe, mechanical stirrer, condenser, 25% NaOH (by weight) inlet, and tube inlet. With stirring, the pH was initially adjusted to 10.5 and controlled throughout the reaction by pumping in base solution, keeping the pH near 10.5. Into a separate flask, a 5 wt % stock solution of Zonyl FSN-100® (Zonyl) a fluorosurfactant with the chemical structure, $F(CF_2CF_2)_{3\text{-}8}$—$CH_2CH_2O$—$(CH_2CH_2O)_xH$ ($M_w$=950 g/mol) (10.5 g, 11.0 mmol) was dissolved into 200 g of methylene chloride. Just prior to reacting, triethylamine (0.77 mL, 5.5 mmol) was added to this stock solution. The chloroformate was prepared by pumping the stock solution through a tubular reactor at a rate of 16.6 g/min. for 4 minutes (3.32 g of the fluorosurfactant total, 3.5 mol % based on BPA) and adding phosgene at a rate of 0.4 g/min (over a 4/1 mole ratio of phosgene per fluorosurfactant hydroxyl group). Each reagent was added in the first section of tubing and pumped through four additional mixing sections before being pumped into the batch reactor. After four minutes of charging the chloroformate to the Morton flask, the flow of the Zonyl stock solution was discontinued and the phosgene flow raised to 0.75 g/min. for 16 minutes (12 g phosgene total, 122.4 mmol). During this process, 25% NaOH was continuously added to maintain the reaction pH around 10.5. A final pH of 9.8 was established, and the polymer solution was separated from the brine, washed with aqueous HCl, washed with water, precipitated into hot water, and dried. $M_w$=25,100 (Polystyrene standards). Proton NMR indicated that complete incorporation of the fluorosurfactant hydroxy groups to fluorosurfactant-carbonate polymer chain end groups was obtained.

Example 10

Ex. 9 was repeated with 1 mol % Zonyl introduced as Zonyl-chloroformate through the tube, and 3.5 mol % p-cumylphenol as the remainder of the mono-functional chain terminating species. Proton NMR indicated complete conversion of the Zonyl hydroxyl groups to Zonyl-carbonate polymer chain end groups. $M_w$=44,100 (Polystyrene standards). A compression-molded film exhibited a contact angle with water of 94.1°.

Example 11

The following were added into a 70 L CSTR equipped with an overhead condenser and a recirculation pump with a flow rate of 40 L/minute: (a) BPA (6500 g, 28.51 mol); (b) 2,2,3, 4,4,4-hexafluorobutanol (C4F6-OH) (259.4 g, 1.42 mol); (c) triethylamine (59.6 mL, 0.43 mol); (d) methylene chloride (38 kg); and (e) de-ionized water (13.3 kg). The pH of the reaction mixture was adjusted to 12 by the addition of base (50% NaOH is deionized water). The mixture was charged with phosgene (3757 g, 140 g/min, 38 mol). During the addition of phosgene, base (50 wt % NaOH in deionized water) was simultaneously charged to the reactor to maintain the pH of the reaction between 9-12. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110 deg C. before analysis. $^{31}$P NMR proved the existence of a poly(bisphenol A carbonate) with >95% 2,2,3,4,4,4-hexafluorobutyl-carbonate polymer chain end groups. Surface analysis by X-ray photoacoustic spectroscopy (XPS) confirmed existence of fluorine on the surface, and an enhancement of fluorine at the surface compared to the bulk. The $M_w$ of the polymer was 30,400 g/mol (calculated by polycarbonate universal calibration curve).

Example 12

The following were added into a 70 L CSTR equipped with an overhead condenser and a recirculation pump with a flow rate of 40 L/minute: (a) BPA (6500 g, 28.51 mol); (b) C4F6-OH (320.74 g, 1.76 mol); (c) triethylamine (59.6 mL, 0.43 mol); (d) methylene chloride (38 kg); and (e) de-ionized water (13.3 kg). The pH of the reaction mixture was adjusted to 12 by the addition of base (50% NaOH is deionized water). The mixture was charged with phosgene (3757 g, 140 g/min, 38 mol). During the addition of phosgene, base (50 wt % NaOH in deionized water) was simultaneously charged to the reactor to maintain the pH of the reaction between 11-13. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110 deg C. before analysis. $^{31}$P NMR proved the existence of a poly(bisphenol A carbonate) with >95% 2,2,3, 4,4,4-hexafluorobutyl-carbonate polymer chain end groups. Surface analysis by X-ray photoacoustic spectroscopy (XPS) confirmed existence of fluorine on the surface, and an enhancement of fluorine at the surface compared to the bulk. The $M_w$ of the polymer was 17,100 g/mol (calculated by polycarbonate universal calibration curve).

Example 13

The following were added into a 70 L CSTR equipped with an overhead condenser and a recirculation pump with a flow rate of 40 L/minute: (a) BPA (6500 g, 28.51 mol); (b) HFIP (239.4 g, 1.42 mol); (c) triethylamine (59.6 mL, 0.43 mol); (d) methylene chloride (37.8 kg); and (e) de-ionized water (13.3 kg). The mixture was charged with phosgene (3757 g, 140 g/min, 38 mol). During the addition of phosgene, base (50 wt % NaOH in deionized water) was simultaneously charged to the reactor to maintain the pH of the reaction between 9-11. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110 deg C. before analysis. $^{31}$P NMR proved the existence of a poly(bisphenol A carbonate) with >95% 1,1,1, 3,3,3-hexafluoro-2-propyl-carbonate polymer chain end groups. Surface analysis by X-ray photoacoustic spectroscopy (XPS) confirmed existence of fluorine on the surface, and an enhancement of fluorine at the surface compared to the bulk. The $M_w$ of the polymer was 18,000 g/mol (calculated by polycarbonate universal calibration curve).

Example 14

The following were added into a 70 L CSTR equipped with an overhead condenser and a recirculation pump with a flow rate of 40 L/minute: (a) BPA (6500 g, 28.51 mol); (b) HFIP (143.7 g, 0.85 mol); (c) triethylamine (59.6 mL, 0.43 mol); (d) methylene chloride (37.2 kg); and (e) de-ionized water (13.2 kg). The mixture was charged with phosgene (3757 g, 140 g/min, 38 mol). During the addition of phosgene, base (50 wt % NaOH in deionized water) was simultaneously charged to the reactor to maintain the pH of the reaction between 9-11. After the complete addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110 deg C. before analysis. $^{31}$P NMR proved the existence of a poly(bisphenol A carbonate) with >95% 1,1,1, 3,3,3-hexafluoro-2-propyl-carbonate polymer chain end groups. Surface analysis by X-ray photoacoustic spectroscopy (XPS) confirmed existence of fluorine on the surface, and an enhancement of fluorine at the surface compared to the bulk. The $M_w$ of the polymer was 23,600 g/mol (calculated by polycarbonate universal calibration curve).

Example 15

Into a clean, dry glass cylindrical glass polymerization reactor (30 cm in length, 3.2 cm diam.) was charged: (a) BPA (17.28 g, 0.076 mol); (b) bis(methylsalicyl) carbonate (BMSC) (25.0 g, 0.076 mol); (c) 2,2,3,3,4,4,5,5,6,6,7,7,8,8, 9,9,10,10,10-nonadecafluoro-1-decanol (C10F19-OH) (2.02 g, 0.004 mol); (d) NaOH ($8.0 \times 10^{-6}$ g, $2.0 \times 10^{-7}$ mol); and (e) tetra-butylphosphonium acetate (0.00381 g, $1.2 \times 10^{-5}$ mol). The atmosphere inside the reactor was then evacuated using a vacuum source and purged with nitrogen. This cycle was repeated 3 times after which the contents of the reactor were heated to melt the monomer mixture. Then, the following temperature/pressure profile was used for the reaction: (1) 180 deg C., 1 atm for 10 min; (2) 220 deg C., 1 atm, 15 min; (3) 250 deg C., 100 mb, 15 min; (4) 260 deg C. 3.1 mb, 5 min; and (5) 270 deg C., 2.5 mb, 5 min. After allowing the reaction to proceed under these conditions, the pressure inside the reactor was brought to atmospheric pressure and the reactor was vented to relieve any excess pressure. Product isolation was accomplished by breaking the glass reactor and collecting the material $M_w$=24,000 g/mol (PS standards); $T_g$=138 deg C. $^{19}$F NMR proved the existence of a C10F19-carbonate polymer chain end-group. Fries rearrangement not detectable by NMR (<100 ppm) and end-capping efficiency of fluorinated alcohol is 65.7% (PC—OH=32.5%, and end capped MS=1.8%).

Example 16

TFE-PC (made similar to the methods above), Mw=33,000 g/mol, was blended with bisphenol A-polycarbonate at a ratio of 72:28 (PC:TFE-PC). A phosphite heat and various amounts of potassium perfluorobutylsulfonate FR agent were added to the blend Example 17

TFE-PC (made similar to the methods above), Mw=33,000 g/mol, was blended with bisphenol A-polycarbonate at a ratio of 60:40 (PC:TFE-PC). A phosphite heat-stabilizer and various amounts of potassium perfluorobutylsulfonate FR agent were added to the blend.

Example 18

The following were added into a 70 L CSTR equipped with an overhead condenser and a recirculation pump with a flow rate of 40 L/minute: (a) BPA (2500 g, 10.96 mol); (b) TFE (120 g, 1.2 mol); (c) 80% tetrabutylammonium chloride in water (TBAC, 24.36 g, 0.11 mol) (d) methylene chloride (14 kg); and (e) de-ionized water (13.1 kg). The mixture was charged with phosgene (2771 g, 120 g/min, 28 mol). During the addition of phosgene, base (50 wt % NaOH in deionized water) was simultaneously charged to the reactor to maintain the pH of the reaction between 4-7. After the total phosgene was delivered, the pH was raised to pH 11, 300 grams of di-eugenol-capped polydimethylsiloxane with a molecular weight of approximately 3,270 g/mol was added to the reactor, and the reaction was stirred for 15-20 minutes while maintaining the ph at 11 by the addition of caustic solution. A second addition of BPA (2,500 g, 10.96 mol) was added and the pH was maintained at a pH of 11. Triethylamine (42.3 g, 0.41 mol) was added and an additional 1000 grams of phosgene was delivered to the reaction flask at a rate of 120 g/min. After the total addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110 deg C. before analysis. $^{31}$P NMR proved the existence of a polycarbonate-siloxane copolymer with >95% 2,2,2-trifluoroethylcarbonate polymer chain end groups. Surface analysis by X-ray photoacoustic spectroscopy (XPS) confirmed existence of silicon and fluorine on the surface. The $M_w$ of the polymer was 26,600 g/mol (calculated by polycarbonate universal calibration curve). The materials were extruded and molded using normal ASTM conditions for polycarbonate.

Example 19

The following were added into a 2 L 5-necked glass reactor: (a) BPA (50 g, 0.22 mol); (b) 1,1-bis(4-hydroxy-3-methylphenyl)cyclohexane (DMBPC) (50 g, (0.19 mol) (c) C4F6-OH (3.77 g, 0.021 mol); (d) triethylamine (0.87 mL, 0.0015 mol); (e) methylene chloride (579 mL); and (f) de-ionized water (193 mL). The mixture was charged with phosgene (54.5 g, 2.0 g/min, 0.55 mol). During the addition of phosgene, base (25 wt % NaOH in deionized water) was simultaneously charged to the reactor to maintain the pH of the reaction between 9-11. After the complete addition of phosgene, the reaction was purged with nitrogen gas, and the organic layer was extracted. The organic extract was washed once with dilute hydrochloric acid (HCl), and subsequently washed with de-ionized water three times. The organic layer was separated and precipitated into vigorously stirred hot water. The polymer was dried in an oven at 110 deg C. before analysis. $^{31}$P NMR proved the existence of a poly(BPA-DMBPC) copolymer with >97% TFE-carbonate polymer chain end groups. The $M_w$ of the polymer was 20,100 g/mol (calculated by polycarbonate universal calibration curve).

Example 20

The following were added into a 2 L 5-necked glass reactor: (a) resorcinol (35.25 g, 0.32 mol); (b) deionized water (50 mL); (c) anhydrous methylene chloride, HPLC grade (450 mL) (d) HFIP (2.75 g, 0.016 mol) (e) methyltributylammonium chloride (0.3 mL), and (f) triethylamine (1.15 g, 0.008 mol). A 33 wt % solution of a 50:50 mixture of iso:terepthalyl chloride dissolved in anhydrous methylene chloride (150.1 g, 0.25 mol of diacid chloride) was added to the reactor over a period of 10-15 minutes via an addition funnel. The pH of the reaction was maintained between 6-8 by the addition of 25 wt % NaOH in deionized water. After the polyester condensation, the polyarylate mixture was charged with (a) BPA (37.4 g, 0.16 mol); (b) deionized water (400 mL), and (d) phosgene (20.0 g, 2.0 g/min., 0.20 mol). The pH was maintained between 10-12 during phosgenation by the addition of a 25 wt % caustic solution. After the complete addition of phosgene, the organic extract was washed once with dilute hydrochloric acid (HCl), and subsequently washed with de-ionized water three times. The organic layer was separated and precipitated into vigorously stirred hot water. The polymer was dried in an oven at 110 deg C. before analysis.

Example 21

Into a 1 L Morton flask was charged 22.8 g (99.8 mmol) bisphenol-A (BPA), 100 mL methylene chloride, 100 mL distilled water, and 200 mL (1.43 mmol) triethyl amine. The flask was equipped with a calibrated pH probe, mechanical stirrer, condenser, 25% NaOH (by weight) inlet, and tube inlet. The pH was initially adjusted to 10.5 and controlled throughout the reaction by pumping in base solution. A 2 weight percent stock solution of 2,2,2-trifluoroethanol (TFE) containing 1 eq. TEA/—OH was prepared by dissolving 3.06 g (30.6 mmol) and 4.27 mL triethyl amine (TEA, 30.6 mmol) in 150 g of methylene chloride. For the initial 8 minutes of the experiment, phosgene alone was pumped into the Morton flask at a rate of 0.75 g/min, delivering 6.0 g phosgene. At that point the phosgene flow was halted and 5.23 g of a 26.3 weight percent d-50 eugenol siloxane bischloroformate (EuSi-BCF) solution in methylene chloride was added, delivering 1.4 g of EuSi-BCF in total. Stirring continued for 5 minutes at pH 10.5 before pumping in the TFE chainstopper. TFE chloroformate was prepared using a 5 section tubular reactor and a flow rate of TFE stock solution of 12.0 g/min. Phosgene flow during TFE chloroformate production was held at 0.94 g/min (4:1 ratio of phosgene/—OH). Upon delivering 0.5 g of TFE to the reaction, the tube flow was shut off to the reactor and phosgenation resumed at a rate of 0.75 g/min until 20% excess had been delivered (~12.5 g phosgene) based on total BPA. The reaction was purged to the scrubber with nitrogen to remove excess phosgene and then centrifuged. The methylene chloride layer was washed with aq. 1 N HCl and twice with distilled water before isolation by steam precipitation. The isolated polymer was dried in a 110° C. vacuum oven overnight before analysis was performed. NMR performed in $CDCl_3$ confirmed 5.0 wt % of EuSi and 2.7 mol % of TFE presenting by $^1H$ integration. An average water contact angle measurement of 108.5° was obtained on a clear compression molded film. $M_n$=19,408, $M_w$=60,285, PDI=3.11 based on polystyrene standards. $T_g$=139.7° C.

Example 22

The following were added into a 70 L CSTR equipped with an overhead condenser and a recirculation pump with a flow rate of 40 L/minute: (a) BPA (2500 g, 10.96 mol); (b) TFE (120 g, 1.2 mol); (c) 80% tetrabutylammonium chloride in water (TBAC, 24.36 g, 0.11 mol) (d) methylene chloride (14 kg); and (e) de-ionized water (13.1 kg). The mixture was charged with phosgene (2771 g, 120 g/min, 28 mol). During the addition of phosgene, base (50 wt % NaOH in deionized water) was simultaneously charged to the reactor to maintain the pH of the reaction between 4-7. After the total phosgene was delivered, the pH was raised to pH 11, 300 grams of di-eugenol-capped polydimethylsiloxane with a molecular weight of approximately 3,270 g/mol was added to the reactor, and the reaction was stirred for 15-20 minutes while maintaining the ph at 11 by the addition of caustic solution. A second addition of BPA (2,500 g, 10.96 mol) was added and the pH was maintained at a pH of 11. Triethylamine (42.3 g, 0.41 mol) was added and an additional 1000 grams of phosgene was delivered to the reaction flask at a rate of 120 g/min. After the total addition of phosgene, the reaction was purged with nitrogen gas, and the organic layer was extracted. The organic extract was washed once with dilute hydrochloric acid (HCl), and subsequently washed with de-ionized water three times. The organic layer was precipitated from methylene chloride into hot steam. The polymer was dried in an oven at 110 deg C. before analysis. $^{31}P$ NMR proved the existence of a polycarbonate-siloxane copolymer with >95% 2,2,2-trifluoroethylcarbonate polymer chain end groups. Surface analysis by X-ray photoacoustic spectroscopy (XPS) confirmed existence of silicon and fluorine on the surface. The $M_w$ of the polymer was 26,600 g/mol (calculated by polycarbonate universal calibration curve). The materials were extruded and molded using normal ASTM conditions for polycarbonate.

Example 23

TFE-PC was synthesized similar to the method described in example 14 (Mw=35,100 g/mol). Examples 23A, B, C, D and PC control with p-cumylphenol carbonate end-groups were extruded on a twin screw extruder with different loadings of the flame retardant (FR), potassium perfluorobutylsulfonate and subsequently injection molded into 2.3 mm and 1.8 mm flame bars. Table 3 shows the composition and properties of the materials after extrusion and injection molding.

Example 24

TFE-PC (made similar to the methods above), Mw=33,000 g/mol, was blended with bisphenol A-polycarbonate at a ratio of 72:28 (PC:TFE-PC). A phosphite heat and various amounts of potassium perfluorobutylsulfonate FR agent were added to the blend. FR results are listed in Table 3.

Example 25

TFE-PC (made similar to the methods above), Mw=33,000 g/mol, was blended with bisphenol A-polycarbonate at a ratio of 60:40 (PC:TFE-PC). A phosphite heat-stabilizer and various amounts of potassium perfluorobutylsulfonate FR agent were added to the blend. FR results are listed in Table 3.

Example 26

A mixture containing 50 wt % TFE-PC and 50 wt % C4F6-PC made similar to the methods above was blended, extruded and molded into thin circular tubes with inner diameter of 1.5 mm and an outside diameter of 1.75 mm. Example 26 was immersed in platelet-rich plasma (PRP) for one hour and the platelet retention was determined. The results indicated that between 82% and 86% platelets were retained after perfusion in PRP. A polycarbonate control sample with end-groups formed from p-cumylphenol showed 84% retention.

Figure 1:
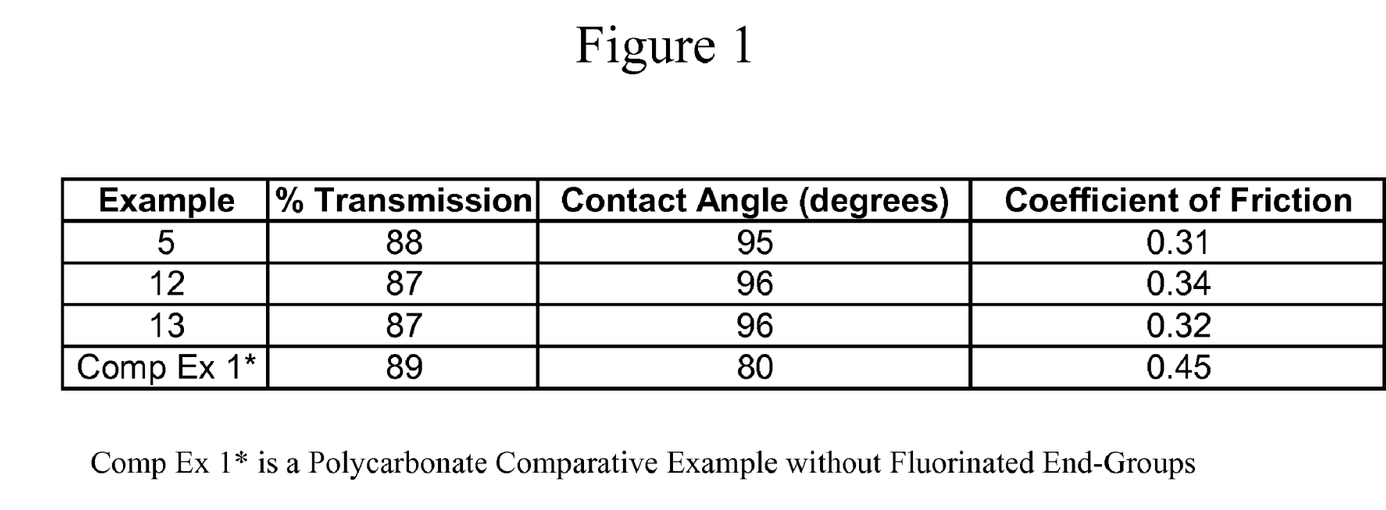
FIG. 1 is a table that compares the contact angle and coefficient of friction for 3 different polycarbonate resins having different fluoroalkylene carbonate end-groups (Examples 5, 12 and 13) with a polycarbonate resin having p-cumylphenol carbonate end-groups (Comp. Ex. 1*).
Figure 2:
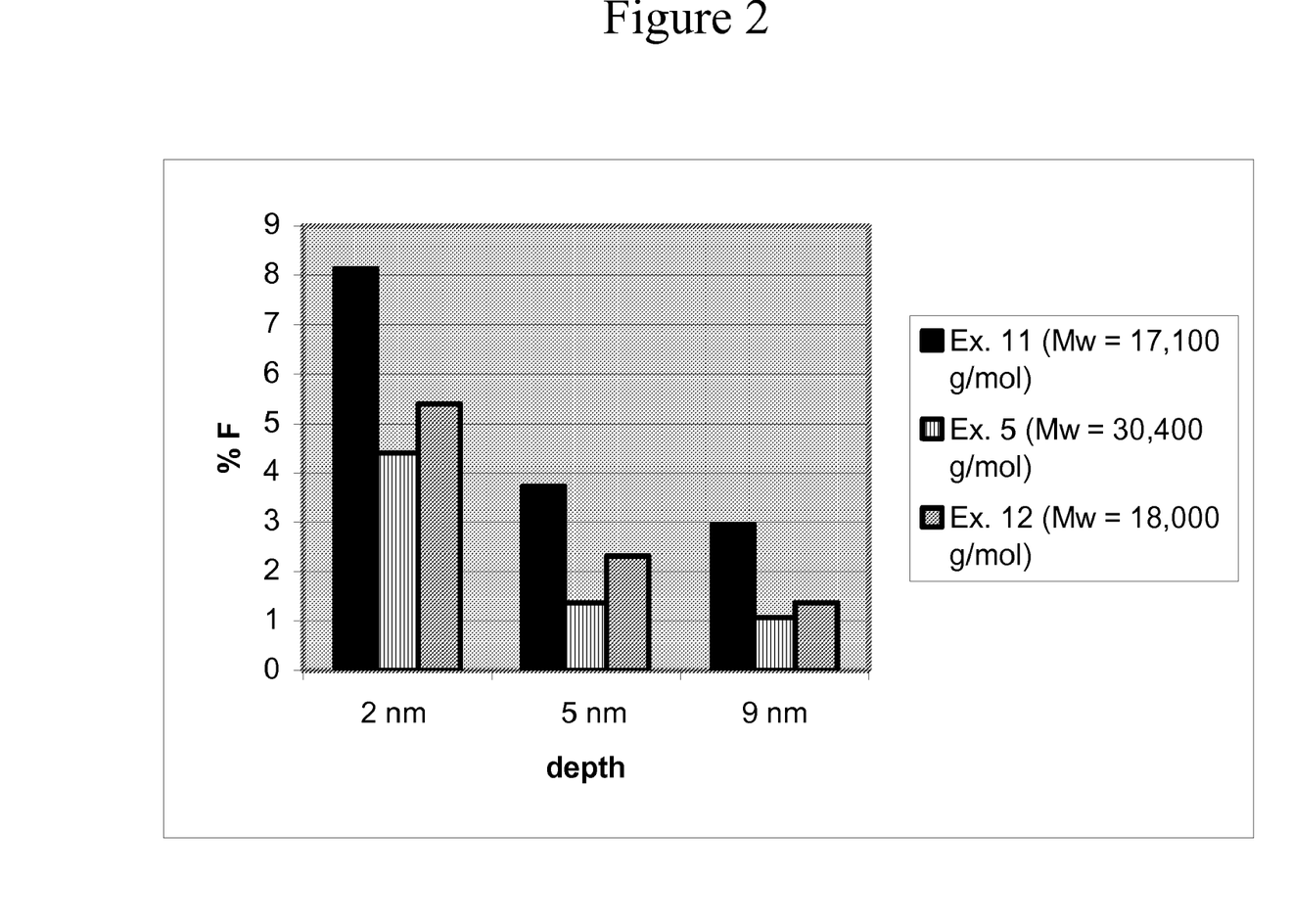
FIG. 2 is a bar graph that compares the % fluorine at 3 different depths (2 nm., 5 nm. and 9 nm) using an XPS measurement method for 3 plaques molded from polycarbonate resins having fluoroalkylene carbonate end-groups.
Figure 3:
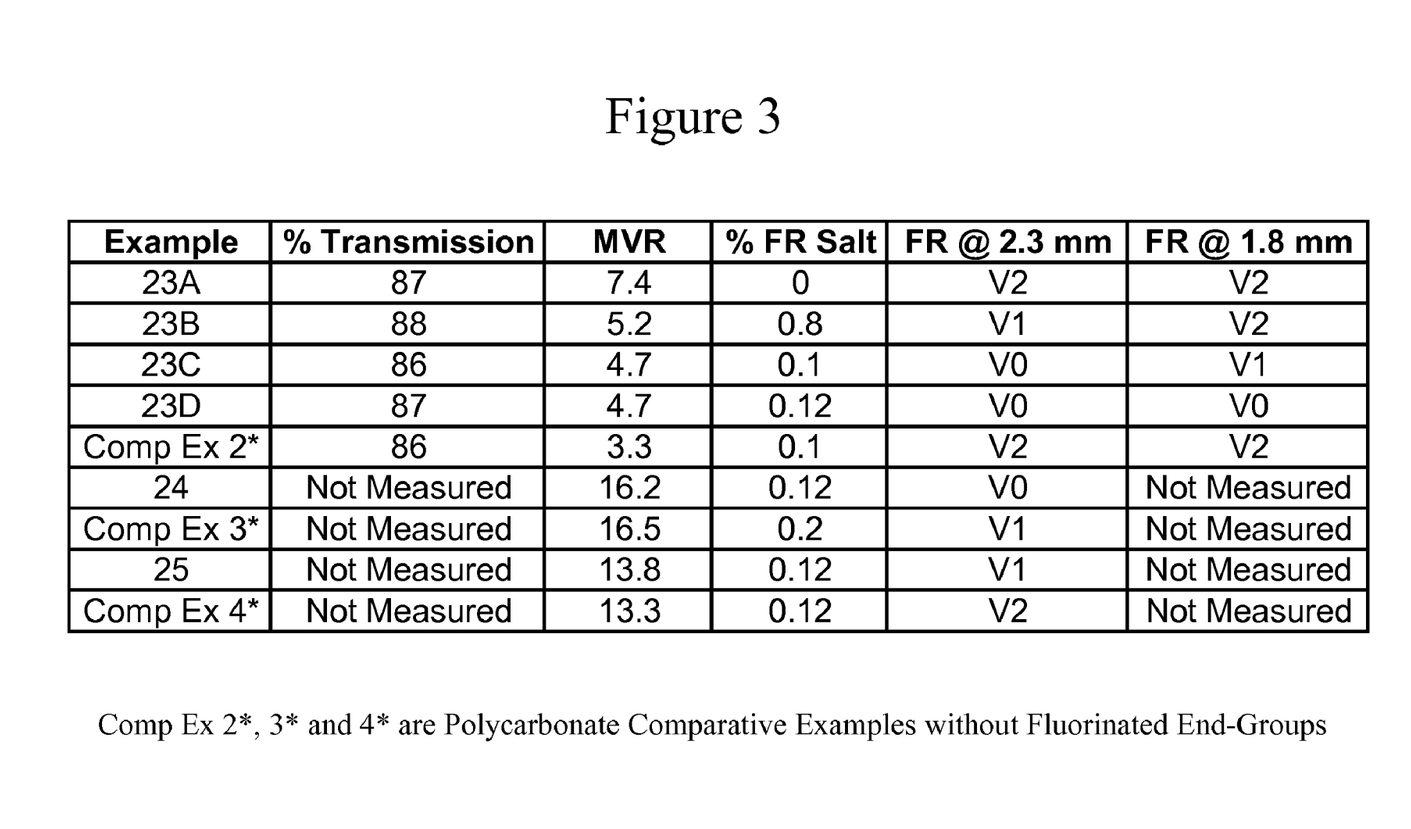
FIG. 3 is a Table that compares the FR performance of FR test bars molded from 6 polycarbonate resins having fluoroalkylene carbonate end-groups (Examples 24A, 24B, 24C, 24D and 25) with 3 polycarbonate resins having p-cumylphenol carbonate end-groups (Comp. Ex. 2*, 3* and 4*).

FIG. 3 displays the FR and melt flow data for Examples 23-25 and the PC control materials with the similar melt flow. All of the materials were blended, extruded, and injection molded under similar conditions. Examples 24 and 25 show good FR characteristics on injection-molded items with relatively thin gauges and higher melt flows. The blends that contain TFE-PC showed better optical properties and flame retardant properties compared to the PC control examples.

What is claimed is:
1. A polycarbonate composition comprising an aromatic polycarbonate resin having fluorinated carbonate end-groups, wherein the fluoroalkylene carbonate end-groups were formed from 2,2,3,4,4,4-hexafluorobutanol, wherein the 2,2,3,4,4,4-hexafluorobutanol is reacted with bisphenol-A and phosgene in the presence of an alkyl amine or a phase transfer catalyst in the presence of water and an organic solvent using a one-step interfacial method and further wherein the fluoroalkylene carbonate end groups comprise 90% or greater of the total end-groups of the aromatic polycarbonate resin, wherein the composition further comprises an FR additive, and wherein the FR additive is an alkali metal, alkali earth metal, tetraorganophosphonium or tetraorganoammonium salt of a perfluorinated alkyl sulfonic acid.

2. The composition of claim 1, wherein the aromatic polycarbonate resin is a co-polycarbonate selected from the group consisting of a polyarylester-co-aromatic polycarbonate, a polyalkylester-co-aromatic polycarbonate, and a polydimethylsiloxane-co-aromatic polycarbonate block copolymer.

3. The composition of claim 2, wherein the aromatic polycarbonate resin is a polydimethylsiloxane-co-polycarbonate block copolymer having residues formed from eugenol, 2-allylphenol or 4-allylphenol.

4. The composition of claim 1 further comprising a thermoplastic polymer selected from the group consisting of an aromatic polycarbonate, a polyarylester-co-aromatic polycarbonate, a polyalkylester-co-aromatic polycarbonate, a polydimethylsiloxane-co-aromatic polycarbonate block copolymer, a polyester, and a polyimide.

5. A polycarbonate according to claim 1 wherein the aromatic polycarbonate resin comprises at least some aromatic carbonate end-groups that are not fluorinated.

6. The composition of claim 1, wherein the FR additive is potassium nonafluorobutane sulfonate.

7. An article wherein part of a surface of said article comprises a surface having the composition of claim 1 and wherein the surface having the composition of claim 1 has a water contact angle of greater than 85°.

8. The article of claim 7, wherein the article has a V1 or V0 rating as measured by the method of UL 94 at 2.3 mm or greater thickness.

9. An article comprising the composition of claim 1, wherein the article has a haze of less than 5.

10. The article of claim 7, wherein the article has a V1 or V0 rating as measured by the method of UL 94 at 1.8 mm or greater thickness.

11. The composition of claim 1, wherein the FR additive is a salt of a perfluorinated alkyl sulfonic acid selected from the group consisting of trifluoromethane sulfonic acid, nonafluorobutane sulfonic acid, and heptadecafluorooctane sulfonic acid.

12. An article comprising the composition of claim 1.

13. The article of claim 12, wherein the article has a V1 or V0 rating as measured by the method of UL 94 at 2.3 mm or greater thickness.

* * * * *